UNITED STATES PATENT OFFICE.

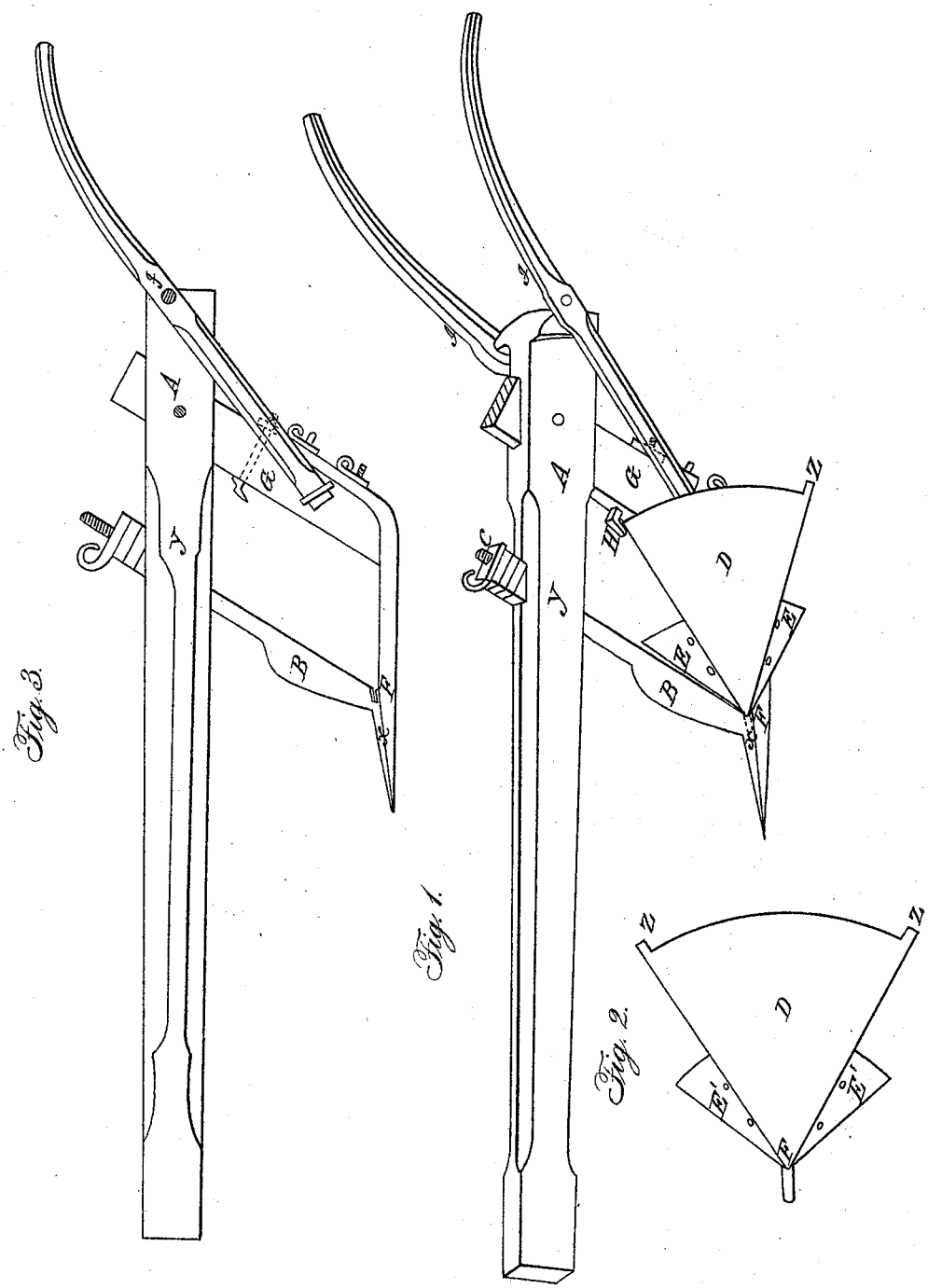

JAMES RORABAUGH, OF LUNEY'S CREEK, VIRGINIA.

IMPROVEMENT IN HILLSIDE-PLOWS.

Specification forming part of Letters Patent No. 4,870, dated December 3, 1846.

*To all whom it may concern:*

Be it known that I, JAMES RORABAUGH, of Luney's Creek, in the county of Hardy and State of Virginia, have invented a new and Improved Hillside-Plow; and I do hereby declare that the following is a full and exact description.

The nature of my invention consists in providing a plow constructed for such a purpose with a cone-shaped mold-board, which may be moved from one side of the plow to the other, and by doing so to change at pleasure from a right to a left handed plow, and by means of said plow the slope of a hill can with ease be plowed in going and coming at one and the same furrow.

To enable others skilled in the art to make and use my invention, I will proceed to describe its construction and operation, reference being had to the annexed drawings, making a part of this specification, in which—

Figure 1 is the said hillside-plow represented in perspective; Fig. 2, the cone-shaped movable mold-board separate; Fig. 3, the frame of the plow, the mold-board removed.

In Fig. 1, A is the frame of the plow; B, the colter, united at its lower part with the projection of the plow-nose X; C, screw and nut to fasten the upper part of the colter to the beam Y of the plow; D, the cone-shaped movable mold-board; E E, the plowshares, fixed one at each side of the mold-board D; F, the pivot at the point of the mold-board. This pivot is fitted into a recess or groove at the junction of the colter and the plow-nose X. G, the plow-post or heel-timber; H, an iron hook fastened by screw and nut into the plow-post G, to secure the movable mold-board D by said hook in the proper position when at rest, but to be a guide when the mold-board is thrown over to the other side of the plow; I I, the handles of the plow.

The letters used in the description of the plow are the same at the same parts in all the figures.

The peculiarity and novelty in the invention of this hillside-plow is the shape and the mode of using the movable mold-board D, the shape being a section of a part of a cone of proper shape when cut in three or four parts from its point toward the base. At the point of this section-cone is the pivot F as a center on which the mold-board turns. At both sides— from the pivot F half-way toward the base— are fixed by screw and bolts the plowshares E E, and following the same line with the plow-share to the extremity of the base, there is at each corner or side a projection, z z, fixed, which projection prevents the mold-board D from slipping farther than the hook H when turned over, and to keep it stationary when the plow is in operation.

The operation of the hillside-plow is simply this: If desired to repass a furrow and to throw the turf on the same side as before, the plow-man, after turning his horse in the line of the furrow, raises by the motion of his foot or otherwise the projection Z on the mold-board from the ground, which will make to tilt over the mold-board D to the other side of the plow; and by such a motion of the mold-board the one plowshare E, which was before in action on the ground, will be raised up and be hidden behind the back of the colter, and the other plowshare will come at the other side of the plow on the ground and in action.

I claim—

The shape and the use of the hook H, in combination with the conical mold-board, for the purpose to keep the mold-board D in its position, and in same time to serve as a guide in the motion of the mold-board when thrown from one side to the other of the plow, as described before.

JAMES RORABAUGH.

Witnesses:
G. T. BARBEE,
SAML. R. NELSON.